(No Model.)
J. R. S. BIRCH.
CIGAR LIGHTER.
No. 483,891. Patented Oct. 4, 1892.
Fig. 1.
Fig. 2.
Fig. 3.
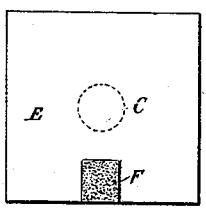
Fig. 4.
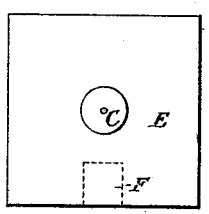
Fig. 5.
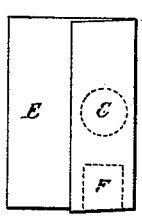
Fig. 6.
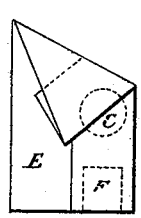
Fig. 7.
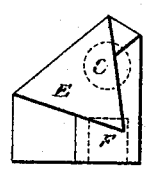
Fig. 8.
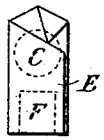
Fig. 9.
Fig. 13.
Fig. 12.
Fig. 11.
Fig. 10.
Witnesses:
Inventor
Joseph R. S. Birch
By
Atty. Attorney.

UNITED STATES PATENT OFFICE.

JOSEPH R. S. BIRCH, OF SAN DIEGO, CALIFORNIA.

CIGAR-LIGHTER.

SPECIFICATION forming part of Letters Patent No. 483,891, dated October 4, 1892.

Application filed June 6, 1890. Serial No. 354,531. (No model.)

*To all whom it may concern:*

Be it known that I, JOSEPH R. S. BIRCH, a citizen of the United States, and a resident of the city and county of San Diego, State of California, have invented a new and useful Improvement in Cigar-Lighters; and I hereby declare that the following is a full, clear, and exact description of the same, reference being had to the accompanying drawings.

My invention relates to cigar-lighters, and has for its object to produce, by certain means hereinafter described, an ignition of the cigar in all conditions of weather and in a manner which will preclude the generation of smoke or gas by said means and the consequent injury to the flavor of the cigar.

My invention consists generally in a disk of wood and a stem therefor adapted in operation to be affixed to the lighting end of a cigar and chemically prepared in a manner to produce when ignited a coal of fire with little or no flame and without smoke or gas, which will in turn cause a complete ignition of the cigar; and my invention also contemplates a covering for said disk which is designed to protect the same and the igniting material thereon and to be removed therefrom when an ignition is to be produced, all of which will be hereinafter fully explained, and specifically pointed out in the claims concluding this specification.

In the accompanying drawings, which form a part of this specification, Figures 1, 2, and 3 represent in perspective views the disk and stem employed. Figs. 4, 5, 6, 7, 8, 9, and 10 represent views of a square of tissue-paper employed to protect said disk, showing the various forms it assumes during the act of folding. Fig. 11 is a view in perspective of the disk and its stem and having the tissue-paper folded over the disk and ready to be applied to a cigar. Fig. 12 is a view of a cigar with the lighter attached; and Fig. 13 is a view similar to Fig. 12, the tissue, however, being removed and the cigar ready for ignition.

In practicing my invention I take any perfectly-dry light wood of close grain—such as pine, linden, and the like—and form therefrom round disks $c$ of suitable diameter and thickness to suit the size of the lighting end of the cigars, these disks being preferably cut across the grain of the wood employed, so that the pores may terminate on the flat surfaces. These disks are then treated chemically in such a manner as to cause an ignition thereof by friction. This treatment may be done by any known method, but preferably by the following: I prepare a solution of lead which is composed of one part of nitrate of lead to eight parts of water, or the solution may be made stronger or weaker, as may be required. This solution is heated to the boiling-point and the disks are immersed from fifteen to thirty minutes, during which time the boiling-point is maintained. The disks are removed from the solution and thoroughly dried by natural or artificial heat and are then immersed in another bath, which consists of one part of chlorate of potash to sixteen parts of water, the temperature of which should also be at the boiling-point. The immersion is kept up from one to two minutes, according to the desired results, as it is obvious that the amount of flame generated may be regulated by the time of immersion. If no flame is required of the disks, a less period of immersion should be employed—say from one minute to one and one-fourth minutes.

The disks when ignited produce a coal of fire which continues to burn without smoke or gas until it is entirely consumed, leaving a residue hardly perceptible from cigar-ashes. The virtue of lighting a cigar with a coal of fire produced in this manner is that the coal lasts long enough to thoroughly light the cigar without the necessity of puffing, and the disk being the same size as the end of the cigar a uniform ignition is produced which prevents irregular burning.

The disk is attached to the cigar by means of a stem B, which is made from much harder wood than that selected for the disks. The stem should be prepared by immersion in a solution of nitrate of lead similar to that employed in treating the disks. This stem not only serves as a means for attachment of the disk to the cigar, but by reason of its peculiar nature performs the function of prolonging the light when the cigar is laid aside. In such case the stem will hold the fire after the fire of the cigar has expired, and by drawing on the cigar the light will spread from the stem outward until a relighting of the cigar is attained. The stem is not treated with the chlorate-of-potash solution, as it is the purpose to cause a slow consumption of the stem, which will hold the fire and save a constant relighting of the cigar. The stem should be of a length equal to half the length of a cigar and should be pin-shaped to permit its ready insertion.

I provide a cover for the disk to prevent its accidental lighting and to furnish a lighting-surface, which is constructed as follows: I take ordinary white tissue-paper and cut therefrom suitably-sized squares E, to which is secured by glue or mucilage a small piece of sandpaper, as at F, which is employed to ignite the disks, as will be presently described. This square of paper is folded over the disk in the manner shown in Figs. 4 to 10, inclusive, the sandpaper being exposed, and the cigar and lighter are in condition for use.

In operation (see Figs. 15 and 16) the operator seizes the upper folds of paper and tears them from the disk, leaving the disk exposed. The sandpaper is then drawn quickly over the surface of the disk, which at once becomes ignited and turns to a coal of fire with little or no flame and no smoke or gas. The advantage of such a light is clearly evident. The cigar is not lighted by a flame like that of a match, which in many cases causes an irregular burning of the cigar. In this method a regular ignition takes place. The combustion occurs almost instantly, leaving a clear coal of fire, which retains its size and shape long enough to thoroughly light the cigar. The flame when it arises is more in the nature of a puff, being very rapid in its operation, and, as before stated, the disk will not char, but will be entirely consumed, forming ashes similar to that of the cigar itself.

I do not in this application make claim to the composition or method hereinbefore described for chemically treating the disks to produce an ignition thereof by friction; but What I do claim is—

1. A cigar-lighter adapted to be secured to the outer end of a cigar, comprising a disk chemically treated to produce combustion, a stem connected with the disk and adapted to be inserted in the cigar, an igniting material on the surface of the disk, and a covering for said disk, adapted to be removed therefrom, in the manner and for the purpose set forth.

2. A cigar-lighter adapted to be secured to the outer end of a cigar, comprising a disk chemically treated to perform combustion, a stem for said disk, adapted to be inserted in the cigar, and a cover for the disk, consisting of a square of tissue-paper folded thereon and having a piece of sandpaper, all for the purpose set forth.

3. A cigar-lighter adapted to be secured to the outer end of a cigar, comprising a disk chemically treated to produce combustion, an igniting material on the surface of the disk, a stem for the disk, also chemically treated and adapted to be inserted in a cigar, and a temporary covering for the disk, consisting of a square of tissue-paper connected thereto and having a piece of sandpaper thereon and adapted to be folded over the disk to leave the sandpaper exposed, said covering being adapted to be removed by hand and to be utilized for producing combustion by drawing the sandpaper over the igniting material.

In witness whereof I hereunto affix my signature in presence of two witnesses.

JOSEPH R. S. BIRCH.

Witnesses:
  ROUB WEESNER,
  A. E. MUSSER.